United States Patent
Raj et al.

(10) Patent No.: US 9,160,734 B2
(45) Date of Patent: **\*Oct. 13, 2015**

(54) SERVICE ACTIVATION USING ALGORITHMICALLY DEFINED KEY

(71) Applicant: Visa International Service Association, San Francisco, CA (US)

(72) Inventors: Ashwin Raj, Foster City, CA (US); John Tullis, San Francisco, CA (US); Mark Carlson, Half Moon Bay, CA (US); Patrick Faith, Pleasanton, CA (US); Shalini Mayor, Foster City, CA (US); Joseph Mirizzi, Cooperopolis, CA (US); Lauren White, San Bruno, CA (US); Olivier Brand, Walnut Creek, CA (US); Mike Lindelsee, Redwood City, CA (US)

(73) Assignee: Visa International Service Association, San Francisco, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/288,254

(22) Filed: May 27, 2014

(65) Prior Publication Data
US 2014/0325606 A1    Oct. 30, 2014

Related U.S. Application Data

(63) Continuation of application No. 12/796,087, filed on Jun. 8, 2010, now Pat. No. 8,782,391.

(60) Provisional application No. 61/185,924, filed on Jun. 10, 2009.

(51) Int. Cl.
*H04L 9/32* (2006.01)
*H04L 29/06* (2006.01)
(Continued)

(52) U.S. Cl.
CPC ............ *H04L 63/08* (2013.01); *G06F 21/31* (2013.01); *G06Q 20/02* (2013.01); *G06Q 20/10* (2013.01);
(Continued)

(58) Field of Classification Search
USPC ........ 726/2–6, 10; 713/150, 168, 185; 705/75
See application file for complete search history.

(56) References Cited

U.S. PATENT DOCUMENTS

| 7,069,250 B2 | 6/2006 | Meadow et al. |
| 8,782,391 B2 | 7/2014 | Raj et al. |

(Continued)

FOREIGN PATENT DOCUMENTS

| EP | 1 087 344 A2 | 3/2001 |
| RU | 2354066 C2 | 4/2009 |
| WO | 2005/045649 A1 | 5/2005 |

OTHER PUBLICATIONS

Russian Office Action mailed on Jul. 29, 2014 for RU Patent Application No. 2011153600, English translation, 7 pages.
(Continued)

*Primary Examiner* — Amir Mehrmanesh
(74) *Attorney, Agent, or Firm* — Kilpatrick Townsend & Stockton LLP (57) ABSTRACT

Systems and methods for service activation using algorithmically defined keys are disclosed. A consumer who has a relationship with a first party may wish to enroll in a service provided by a third party. The first party can maintain control of such enrollments through the use of algorithmically defined keys. The algorithmically defined keys also allow the third party service provider to verify data provided by the consumer as matching data stored by the first party. The verification provides for data synchronization without requiring the third party to have access to the first parties data systems.

20 Claims, 9 Drawing Sheets

(51) Int. Cl.
  *G06F 21/31*    (2013.01)
  *G06Q 20/02*    (2012.01)
  *G06Q 20/10*    (2012.01)
  *G06Q 20/38*    (2012.01)
  *G06Q 20/40*    (2012.01)
  *H04L 9/06*     (2006.01)
  *H04L 9/08*     (2006.01)
  *G06Q 40/02*    (2012.01)

(52) U.S. Cl.
  CPC .......... *G06Q 20/3829* (2013.01); *G06Q 20/40* (2013.01); *G06Q 20/4037* (2013.01); *G06Q 40/02* (2013.01); *H04L 9/0643* (2013.01); *H04L 9/0861* (2013.01); *H04L 9/321* (2013.01); *H04L 9/3226* (2013.01); *H04L 9/3236* (2013.01); *G06F 2221/2117* (2013.01)

(56) References Cited

U.S. PATENT DOCUMENTS

| | | |
|---|---|---|
| 2002/0144116 A1 | 10/2002 | Giobbi |
| 2003/0074327 A1 | 4/2003 | Meadow et al. |
| 2003/0074583 A1 | 4/2003 | Habegger et al. |
| 2003/0097211 A1 | 5/2003 | Carroll et al. |
| 2003/0110375 A1 | 6/2003 | Colvin |
| 2004/0255139 A1 | 12/2004 | Giobbi |
| 2005/0086496 A1 | 4/2005 | Sandberg |
| 2006/0056415 A1 | 3/2006 | Lee et al. |
| 2006/0236385 A1 | 10/2006 | Innes et al. |
| 2007/0006291 A1 | 1/2007 | Barari et al. |
| 2007/0232272 A1 | 10/2007 | Gonsalves et al. |
| 2008/0313260 A1 | 12/2008 | Sweet et al. |
| 2008/0313707 A1 | 12/2008 | Jain et al. |
| 2009/0282239 A1 | 11/2009 | Doleh |

OTHER PUBLICATIONS

Non-Final Office Action mailed on Aug. 1, 2012 for U.S. Appl. No. 12/796,087, 14 pages.
Final Office Action mailed on Mar. 29, 2013 for U.S. Appl. No. 12/796,087, 17 pages.
International Search Report and Written Opinion mailed on Dec. 30, 2010 for PCT Patent Application No. PCT/US2010/038109, 10 pages.
Mexican Office Action mailed on May 10, 2013 for MX Patent Application No. MX/a/2011/013139, 2 pages.
Mexican Notice of Allowance mailed on Nov. 14, 2013 for MX Patent Application No. MX/a/2011/013139, 1 page.
Notice of Allowance mailed on Feb. 25, 2014 for U.S. Appl. No. 12/796,087, 15 pages.
Corrected Notice of Allowance mailed on Apr. 23, 2014 for U.S. Appl. No. 12/796,087, 10 pages.
Corrected Notice of Allowance mailed on May 6, 2014 for U.S. Appl. No. 12/796,087, 11 pages.
Corrected Notice of Allowance mailed on May 19, 2014 for U.S. Appl. No. 12/796,087, 6 pages.
Decision of Grant for RU Patent Application No. 2011153600 dated Jan. 19, 2015, 8 pages.

FIG. 9

SERVICE ACTIVATION USING ALGORITHMICALLY DEFINED KEY

CROSS REFERENCES TO RELATED APPLICATIONS

This application is a continuation application of and claims the benefit of priority of U.S. patent application Ser. No. 12/796,087, entitled, "Service Activation Using Algorithmically Defined Key," filed on Jun. 8, 2010, and U.S. Provisional Patent Application No. 61/185,924, filed on Jun. 10, 2009, all of which are herein incorporated by reference in their entirety for all purposes.

BACKGROUND

Activation keys, as implied by the name, are used to activate something. For example, a piece of computer software may be installed on a computer, but the software may be inoperative until it is activated using an activation key. The vendor of the software may only provide the activation key to those who have been authorized to use the software. Activation keys can also be used to verify that a person signing up for a service is actually authorized to do so. For example, a person may sign up with the local power company to review their home power bill online through the power company's website. Prior to allowing access, the power company may send, through the US Mail, a letter containing an activation key, to the subscribers home address. If the subscriber is able to enter the activation key, access will be granted. This scheme allows the power company to infer with some degree of confidence that the subscriber actually lives at the address, because he has access to mail sent to the address.

Activation keys may also be used to restrict offers to a selected group. For example, a merchant may send his best customers an advertisement that includes a promotion code which will entitle the customers to a discount on a purchase. The promotion code is an activation key that activates the discount. The merchant may not wish to offer the discount to every customer, so through use of an activation key, the offer can be limited to only those who are selected to participate in the promotion.

Activation keys are useful in verifying that an individual is authorized to use the product or service that is being activated. Activation keys can also be used to confirm attributes, such as an address, of persons signing up for services. The distribution of an activation key can also be limited to selected individuals, thus providing a way of limiting who can access a product or service.

BRIEF SUMMARY

Systems and methods for service activation using algorithmically defined keys are disclosed. A consumer who has a relationship with a first party may wish to enroll in a service provided by a third party. The first party can maintain control of such enrollments through the use of algorithmically defined keys. The algorithmically defined keys also allow the third party service provider to verify data provided by the consumer as matching data stored by the first party. The third party can control enrollment by limiting enrollment to only those who provide data which matches that used to generate the algorithmically defined keys. The verification provides for data synchronization without requiring the third party to have access to the first party's data systems.

One embodiment is directed to a method of enrolling a user in a service. The method begins with identifying a user who is authorized to enroll in a service. A first activation code is generated with a first server computer. The first activation code is based on data associated with the user. The first activation code is sent to the user. The user sends the first activation code and data associated with the user to a second server computer. The second server computer generates a second activation code based on the data associated with the user. The second server computer authorizes the user to enroll in the service if the first and second activation codes are the same.

Another embodiment is directed to a method for enrolling a user for a service. Data associated with a user is received from the user at a first server computer. An activation code is received at the first server computer. The activation code is generated based on the data associated with the user. The first server computer generates a confirmation activation code based on the data associated with the user. The user is authorized by the first server computer to enroll in the service if the activation code and confirmation activation code are the same.

Yet another embodiment is directed to a method of enrolling in a service. An activation code is received from a first server computer. The activation code is generated based on data associated with a user. The activation code is sent to a second server computer. Data associated with the user is sent to a second server computer. The service can then be enrolled in only if a confirmation activation code generated by the second server computer is the same as the activation code.

These and other embodiments of the invention are described in further detail below.

DETAILED DESCRIPTION

The examples above of the use of a service activation key all have one thing in common. The entity that wishes to control access to the service is also the same entity that provides the service. Embodiments of the present disclosure provide for the beneficial use of service activation keys when the entity controlling access to the service is different than the entity providing the service. The controlling entity advantageously maintains control of which subscribers are allowed to enroll in the service by maintaining control of distribution of activation keys. The service provider in turn is advantageously able to verify that service enrollees are authorized to enroll in the service. Furthermore, embodiments of the disclosure advantageously allow for the controlling entity and the service provider to ensure verified data synchronization between the controlling entity's databases and the service provider's databases. This synchronization is advantageously achieved without requiring either party to have direct access to the other's data storage systems. The isolation of the data storage systems advantageously prevents a breach in data system security of either party from cascading into a breach of the counterparts data systems.

Many situations can arise in which a person associated with an organization may request or be invited to enroll in a service provided by a service provider that is different from the organization. For example, a person may have a credit card that was issued by a bank. The bank may invite the customer to enroll in a money transfer (MT) service that is provided by a third party. The MT service may allow the customer, who may also be referred to as a card holder, to transfer funds from his credit card account to some other account. Although the credit card is provided by the bank, which can also be referred to as an issuer, the issuer itself is not the provider of the money transfer service.

The preceding example is merely illustrative, and is not intended to limit applications of embodiments of the disclosure. Any situation in which a first entity wishes to control access by a second entity to a service provided by a third entity would equally benefit from embodiments of the present disclosure. For purposes of simplicity of explanation, portions of the remainder of the disclosure will be described in the following terms. An "issuer" refers to the entity that wishes to control access to a service. A "card holder", "customer", or "consumer" refers to the entity that will be enrolling for a service, and typically has an established relationship with the issuer. A "service provider" refers to the entity that is providing the service, and typically has a relationship with the issuer, although the relationship may not be one of complete trust. The service provider typically does not have an already existing relationship with the customer. These definitions are for purposes of simplicity of explanation and are not intended to be limiting.

Providing services, such as the money transfer service as described above, may give rise to numerous challenges. First, the issuer may wish to maintain some degree of control as to exactly which of its customers will be allowed to enroll in a service provided by a service provider. The issuer may decide to extend the offer to enroll in a service to only a select set of customers that meet criteria specified by the issuer. Or, the issuer may desire that the customer request permission from the issuer prior to enrolling in the service. In either case, the issuer may wish to maintain a degree of control as to which customers will be allowed to enroll for services provided by a service provider.

Another challenge that may arise is that the service provider may require certain information about the customer who is attempting to enroll for a service. For example, the service provider may need to know the customer's home address. Such information may be contained within the issuer's customer database. The issuer could provide the service provider with access to the database or a copy of all the information contained therein. However, the issuer may be unwilling to allow the service provider direct access to the data for any of a number of reasons. The issuer may decide that granting such access may provide for an opportunity for a data breach that would expose potentially sensitive customer information. The issuer may decide that the service provider should only have access to data for customers that actually enroll in the service, not for all of the customers. In the simplest case, the issuer, for any reason, may not trust the service provider to the extent required for direct customer data access.

Likewise, the service provider may not want to be held responsible for data of all of the issuer's customers, when in fact the service provider only desires information about specific customers that are enrolling for the service. Regardless of the reason why the service provider does not have access to the issuer's customer database, the service provider still needs to obtain the desired customer information in such a way as to have some assurance that the information is valid.

Yet another challenge that may arise is that the customer may be requested to enter information about himself as part of the enrollment process at the service provider. As the customer is only being given the opportunity to enroll in the service by virtue of being a customer of the issuer, the service provider may desire to verify that the information that is being provided is the same as that which was provided to the issuer. As mentioned above, the issuer may be unwilling to share the customer database information with the service provider. The service provider is thus put in the position of receiving customer information from the customer directly, with no mechanism for verifying the information entered matches that which was provided to the organization.

Embodiments of the present disclosure provide for systems and methods wherein an issuer can maintain control of a customer's enrollment in a service provided by a service provider. The issuer does not need to provide direct database access to the service provider while at the same time allowing for the service provider to be assured that the data being provided by the customer is accurate.

Figure 1:
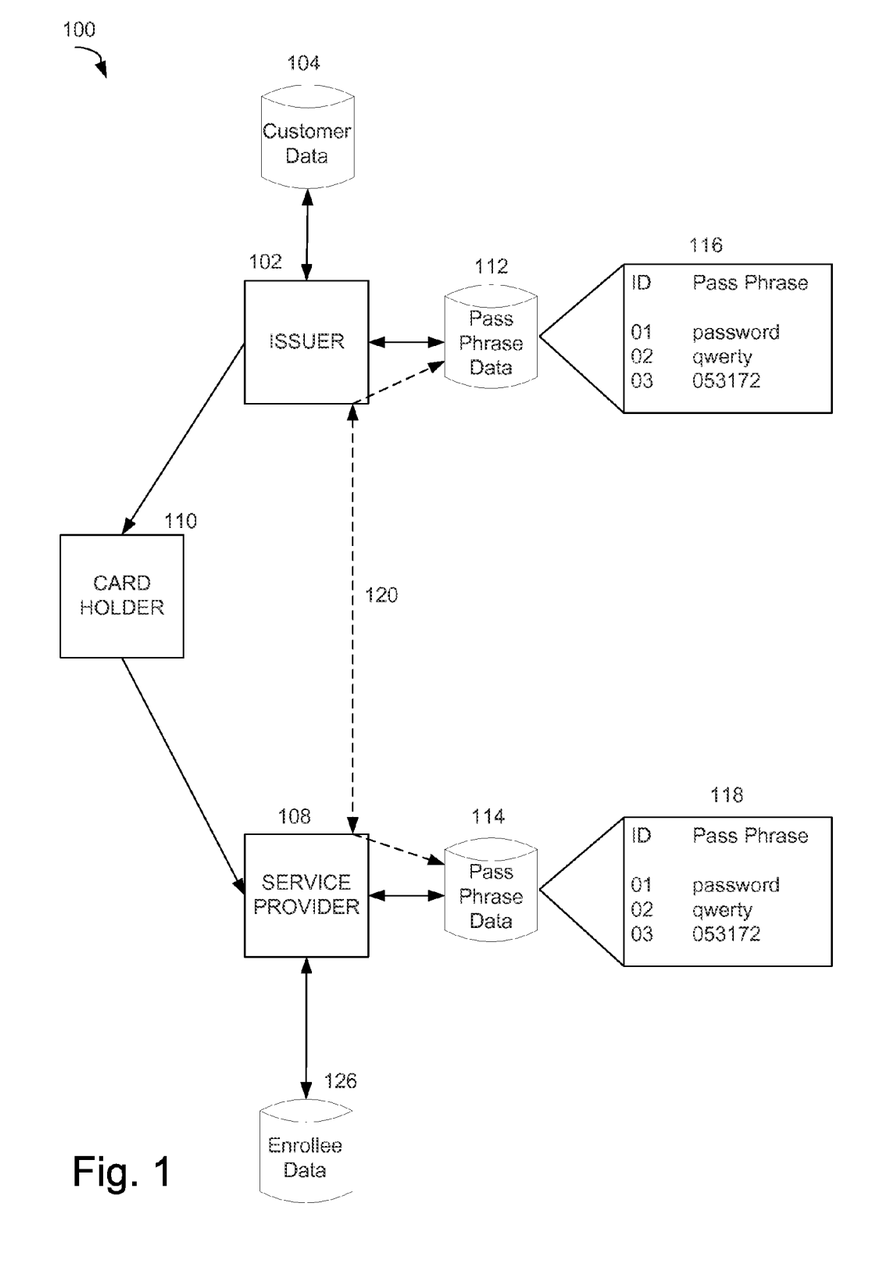
FIG. 1 depicts one exemplary system of the present disclosure.

FIG. 1 depicts one exemplary system of the present disclosure. The example presented with respect to system 100 is in terms of an organization that may be a bank that issues credit cards, and as such, the organization is referred to as the issuer 102. However, it should be understood that embodiments of the disclosure are applicable in any number of situations, and are not limited to a credit card issuer. The issuer 102 may have data regarding its customers stored in a customer database 104. Examples of such data are depicted in table 106. The issuer may store data about a customer's name, his address, his account number, or any other data that the issuer needs to conduct business.

The service provider 108 may provide any of a number of services, such as a money transfer service, to a customer 110 of the issuer 102. In terms of the present example, the customer 110 of the issuer 102 would be a person holding a credit card issued by the issuer 102, and will be referred to as a card holder 110. Again, this is for purpose of explanation only, as any type of customer of any type of organization would also be able to utilize embodiments of the present disclosure.

In the initial setup of the system, the issuer 102 may exchange 120 pass phrase data with a service provider 108. A pass phrase may also be referred to as a password. What should be understood is that the pass phrase is piece of information, typically a string of alphanumeric characters, that is known by only the issuer 102 and the service provider 108. The issuer 102 may store the pass phrase in a pass phrase data repository 112. Likewise, the service provider 108 may also store the pass phrase in a pass phrase data repository 114. Generally, the pass phrase would be stored in some type of encrypted format, thus preventing employees of either the issuer 102 or service provider 108 from directly viewing the pass phrase. The pass phrase would be decrypted by the system only when used.

As would be clear to anyone familiar with security of electronic systems, it is generally desirable to periodically change the pass phrase. For example, the agreement between the service provider 108 and the issuer 102 may require that the pass phrase be changed every 3 months. Thus, if a pass phrase is compromised, it will only be valid for a determined period of time, limiting any potential harm a bad actor in possession of the pass phrase may do. As an additional security measure, the pass phrase may be required to be of a certain length, such as greater than 6, 8, or 12 characters. The pass phrase may be required to contain letters, letters and numbers, or letters, numbers, and special characters. Such a security measure may limit the ability of a bad actor to randomly guess the pass phrase, as the number of potential pass phrases increases with the length and the types of characters used.

The system may need to maintain more than one pass phrase at any given time because older pass phrases may be needed for proper operation of the system, as will be explained in further detail with respect to FIG. 2. For now, it is sufficient to say that the issuer 102 and the service provider 108 may store multiple pass phrases. In order to distinguish between the pass phrases, the issuer 102 and service provider 108 may store an identifier associated with each pass phrase, as depicted in table 116 and table 118. It should be understood that the exchange of the pass phrase occurs independently of a card holder 110 attempting to enroll in a service provided by a service provider 108. It should also be understood that the exchange of the pass phrase can occur through any suitable means. For example, either the issuer 102 or the service provider 108 may provide a web page, or other electronic interface where the pass phrase can be entered. Alternatively, the pass phrase may be communicated between the issuer 102 and the service provider 108 using a telephone, an e-mail, or a regular paper letter. What should be understood is that the issuer 102 and the service provider 108 both have access to the pass phrase and a mechanism for identifying a particular version of the pass phrase.

Furthermore, as part of the initial set up of the system 100, the issue 102 and service provider 108 will need to agree on which pieces of card holder data 106 will be used to generate an activation code. The particular pieces of card holder data used to generate the activation code determine the data that the service provider 108 is able to confirm as being the same as the data that is stored in the issuer's customer data 104. The reason for this will become more clear with respect to FIG. 2.

Figure 2:
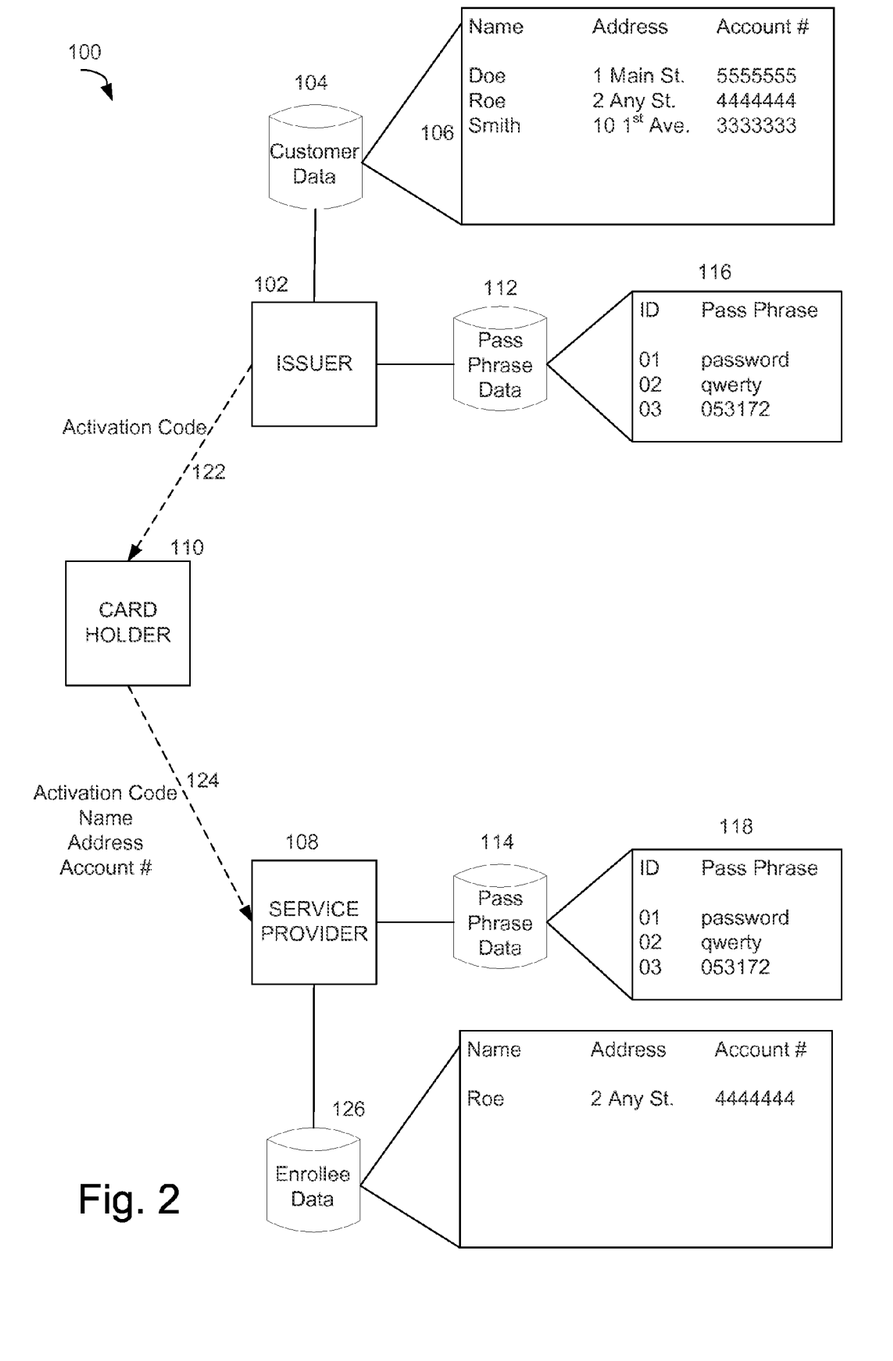
FIG. 2 depicts a high level service activation.

FIG. 2 depicts a high level service activation. Once the system 100 is set up such that the pass phrase has been exchanged, a cardholder 110 may be invited by the issuer 102 to enroll in a service provided by the service provider 108. The issuer 102 may select a card holder 110 to invite to enroll in a service. As part of the invitation, the issuer 102 may generate an activation code that is based on the card holder's data 106. As will be explained in further detail with respect to FIG. 3, the activation code is tightly coupled to the card holder's data 106. The issuer may then send 122 the activation code to the card holder 110. The activation code can be sent to the cardholder 110 through any suitable communications channel. For example, the activation code may be sent to the card holder 110 in a paper mail letter, inviting him to enroll in a service. Alternatively, the activation code could be sent in an e-mail to the card holder 110. It is sufficient to say that the activation code is received by the card holder 110.

Although the above description is in terms of the issuer 102 selecting a card holder 110 to invite to enroll in a service, this is for purposes of explanation only. In some embodiments, the card holder 110 himself may request to enroll in a service by requesting an activation code from the issuer 102. For example, the issuer may provide a web site where the card holder 110 may go to request an activation code. Alternatively, the card holder 110 may make a phone call to a customer service representative of the issuer 102 to receive an activation code. Sending 122 the activation code from the issuer 102 to the card holder 110 is intended to indicate that the issuer 102 actually generates the activation code, and thus has the final determination of which card holders 110 may receive an activation code. As will become clear as the example continues, this advantageously allows the issuer 102 to determine which card holders may enroll for a service, because the issuer 102 can simply refuse to give the card holder 110 an activation code.

Once the card holder 110 has received the activation code from the issuer 102, he may then proceed to enroll in a service provided by the service provider 108. The service provider 108 may provide a web site where the card holder 110 may go to enroll, although embodiments of the disclosure are not limited to enrollment over the web. Enrollment may also be accomplished through other interfaces, such as paper enrollment forms, or a phone call to a customer service representative of the service provider 108. As part of the enrollment process, the card holder 110 may provide 124 the service provider 108 with information about the card holder 110. At a minimum, this information will include the activation code that was sent to the card holder 110 from the issuer 102. Additionally, the information will include any of the card holder's information that was used by the issuer 102 to generate the activation code. As explained above, this is the information that was agreed upon by the issuer 102 and the service provider 108. Finally, the information can include any other information that the service provider 108 requires to enroll the card holder 110 for the service.

For example, the service provider 108 may provide an enrollment web site for a card holder 110 to enroll in a service. The web site may prompt the card holder 110 to enter his activation code. The web site may also prompt the card holder 110 to enter the data that was agreed upon by the issuer 102 and the service provider 108. The web site may also prompt the cardholder to enter information that is only needed by the service provider 108, for other purposes, such as further verification of the card holder. For example, the card holder may be prompted to enter the 3 digit Cardholder Verification Value (CVV) that is printed on the back of his credit card. This may allow the service provider to verify that the cardholder is actually in possession of the credit card.

The service provider 108 may then use the information provided by the card holder 110 to regenerate the activation code. The regenerated activation code may also be referred to as a confirmation activation code. If the regenerated activation code matches the activation code provided by the card holder 110, the service provider 108 can be ensured that the card holder 110 has been authorized by the issuer 102 to enroll in the service. This is because the card holder 110 would not have a valid activation code if it was not received from the issuer 102. Furthermore, the service provider 108 can be ensured that, for at least the pieces of information agreed to initially and used to generate the activation code, the information provided by the card holder 110 is exactly the same as that which is contained in the issuer's customer data 104. The reasons for this will be explained in further detail with respect to FIG. 3. The service provider 108 may then enroll the card holder 110 in the service. As part of the enrollment, the card holder's information may be stored in an enrollee database 126 associated with the service provider 108.

Figure 3:
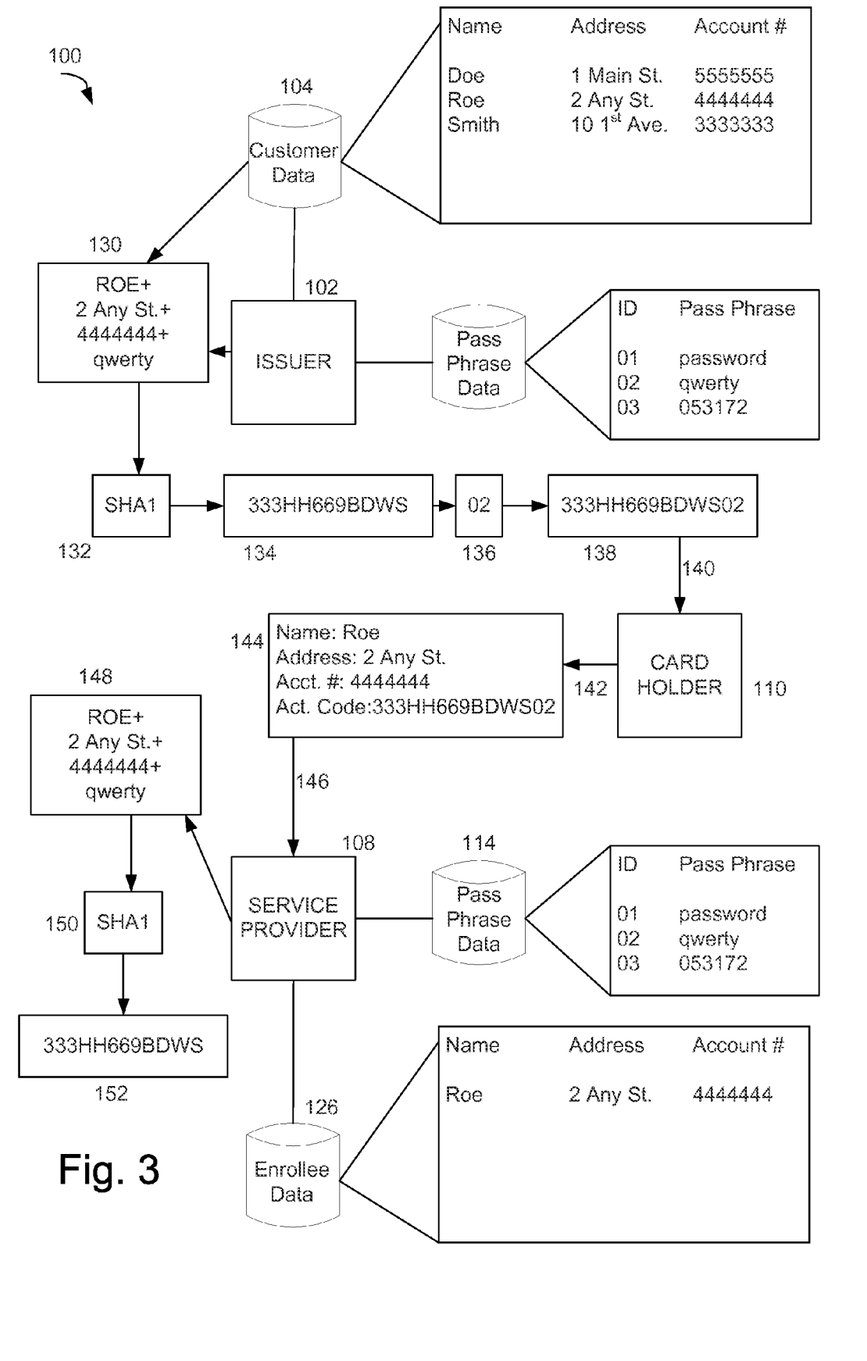
FIG. 3 depicts a lower level service activation.

FIG. 3 depicts a lower level service activation. The process may begin with an issuer 102 retrieving the pieces of information agreed upon by the issuer 102 and the service provider 108 from the customer data 104 of the issuer. For example, the agreed upon data may comprise the account holder's name, his address, and his account number. This should not imply that those pieces of information are all the information stored by the issuer 102 in the customer data 104, but rather they are the pieces of information that were originally agreed to. The issuer 102 may store any other information it desires in the customer data 104.

The issuer 102 may then place the agreed upon information into a data block 130. The issuer may then insert the pass phrase that is currently in effect into the data block 130. In the present example, the agreed to information includes the customer name, address, and account number. The pass phrase 'qwerty' may be the pass phrase that is currently in effect. The data block 130 may then be processed by a hashing algorithm 132. An exemplary hashing algorithm 132 is the Secure Hashing Algorithm-1 (SHA1), however any other hashing algorithm may also be used.

As would be well known to a person of skill in the art of data security, a hashing algorithm such as SHA1 takes as its input a data block that may comprise a series of alphanumeric characters. From this input, the algorithm will produce a fixed length message digest. Typically the digest will be represented by a number that is 128 bits or greater. The numeric value generated by the SHA1 algorithm may be represented by a series of alphanumeric characters 134. A well designed hashing algorithm such as SHA1 ensures that if the data block is changed in any way, even as minor as a single character change, the resulting message digest will contain a different value. The possibility that two different data blocks will generate the same message digest are beyond the scope of statistical probability.

The issuer 102 may append a pass phrase version identifier 136 to the message digest 134 which may result in an activation code 138. As explained above, multiple versions of the pass phrase may exist, and the correct version of the pass phrase will need to be identified later in the process, as will become more clear as the example continues. In an alternative embodiment, prior to appending the pass phrase version identifier, the message digest may be truncated. For example, if the message digest is represented by 16 alphanumeric characters, it may be truncated to only 6, 8, or alphanumeric characters. This truncation may be done for the convenience of the card holder 110, who may have to type in the activation code. The longer the code the greater the probability that the card holder 110 may incorrectly enter the activation code. Although truncating the message digest may decrease security, the probability of two data blocks hashing to the same truncated message digest may be low enough that the service provider 108 and the issuer 102 are willing to take the risk, for the sake of card holder 110 convenience.

The activation code 138 may then be sent 140 to the card holder 110 through any of the mechanisms that were discussed above. The card holder 110 may then proceed 142 to enroll in a service provided by the service provider 108. As part of this enrollment, the card holder 110 may provide 146 the service provider 108 with the activation code and at least all of the card holder 110 information 144 that was used in the process of generating the activation code. As should be clear, aside from the activation code, the data provided by the card holder 110 would be information that the card holder 110 would be expected to know (e.g. his home address). In addition, the service provider 108 may also receive any other information from the card holder 110 that is necessary for enrollment, although only data that was used in generation of the activation code can be verified. The card holder 110 may enroll in the service through any of the mechanisms that were described above.

The service provider 108 may receive 146 the activation code and the card holder provided data 144. The service provider may examine the activation code to determine the version id of the pass phrase that was used to generate the activation code. Using the version id, the service provider may retrieve the appropriate pass phrase from the pass phrase data store 114. The service provider may then create a data block 148 that includes the data elements provided by the card holder 144 and are also data elements that were agreed to by the issuer 102 and the service provider 108. The retrieved pass phrase 114 may also be added to the data block 144. The data block may then be processed 150 by the same hashing algorithm 132, such as SHA1, that was used to generate the message digest 134. The processing will result in a new message digest 152. The activation code, with the pass phrase version id removed, may then be compared to the newly generated message digest 152. In embodiments wherein the activation code is truncated prior to being sent to the card holder 110, the generated activation code will be truncated prior to the comparison.

If the newly generated message digest 152 matches the activation code minus the pass phrase version identifier, the service provider 108 can be ensured of several things. First, the service provider 108 can be ensured that the activation code was actually generated by the issuer 102. This is because it would be almost impossible for a bad actor to generate an activation code that would match the message digest 152 unless the bad actor knew the pass phrase. As the pass phrase should only be known by the issuer 102 and the service provider 108, this is very unlikely to occur. As such, the service provider 108 is advantageously ensured that the card holder 110 has been approved by the issuer 102 to enroll in the service, as if this was not the case, the issuer 102 would have simply refused to provide the card holder 110 with an activation code.

Second, the service provider 108 is also ensured that the information, at least to the extent of the agreed upon information, provided by the card holder 110 matches that which is stored in the issuer 102 customer data 104. As the issuer 102 generates the activation code based on data stored in the customer data 104, if the card holder does not provide exactly the same information, the generated message digest 152 will not match the activation code. This advantageously allows the service provider 108 to know that its data matches the issuer 102 data, but does not require the service provider 108 to have access to the issuer 102 customer data 104. The service provider 108 may then store the ensured accurate information within an enrollee data store 126. The card holder data that is stored in the enrollee data store 126 is advantageously synchronized with the data stored in the issuer customer data 104 without requiring the service provider 208 to have direct access to the issuer customer data 104.

An embodiment of the disclosure that uses a shared pass phrase to perform a hash on a data block has been described above. Alternative embodiments may use different mechanisms depending on the level of security required between the issuer 102 and the service provider 108. For example, the shared pass phrase may not be used at all in generating the message digest. Such an embodiment eliminates the need for setting up an exchange of pass phrase information between the issuer 102 and the service provider 108, however reduces security because anyone who knows the hashing algorithm used could generate an authentication code.

In yet another embodiment, rather than using shared pass phrase data, a public/private encryption key framework may be used. As would be known to a person of skill in the art, in a paired public/private key encryption system, data which has been encrypted using the private key can only be decrypted using the corresponding public key. The public key can be distributed to anyone without regard for its security, whereas the private key is securely safeguarded. Data decrypted using the public key is thus guaranteed to have been encrypted using the private key, which should only be in possession of an authorized user. The data block used to generate the message digest may exclude the shared pass phrase. The resultant message digest may then be encrypted using the private key of the issuer 102, forming an activation code. The service provider 108 may then generate its own message digest using the data provided by the card holder 110. The received activation code can be decrypted using the issuer's public key, and if the decrypted activation code matches the code generated by the service provider 108, it can be confirmed that the issuer 102 actually generated the activation code using the same data that was provided to the service provider 108.

Figure 4:
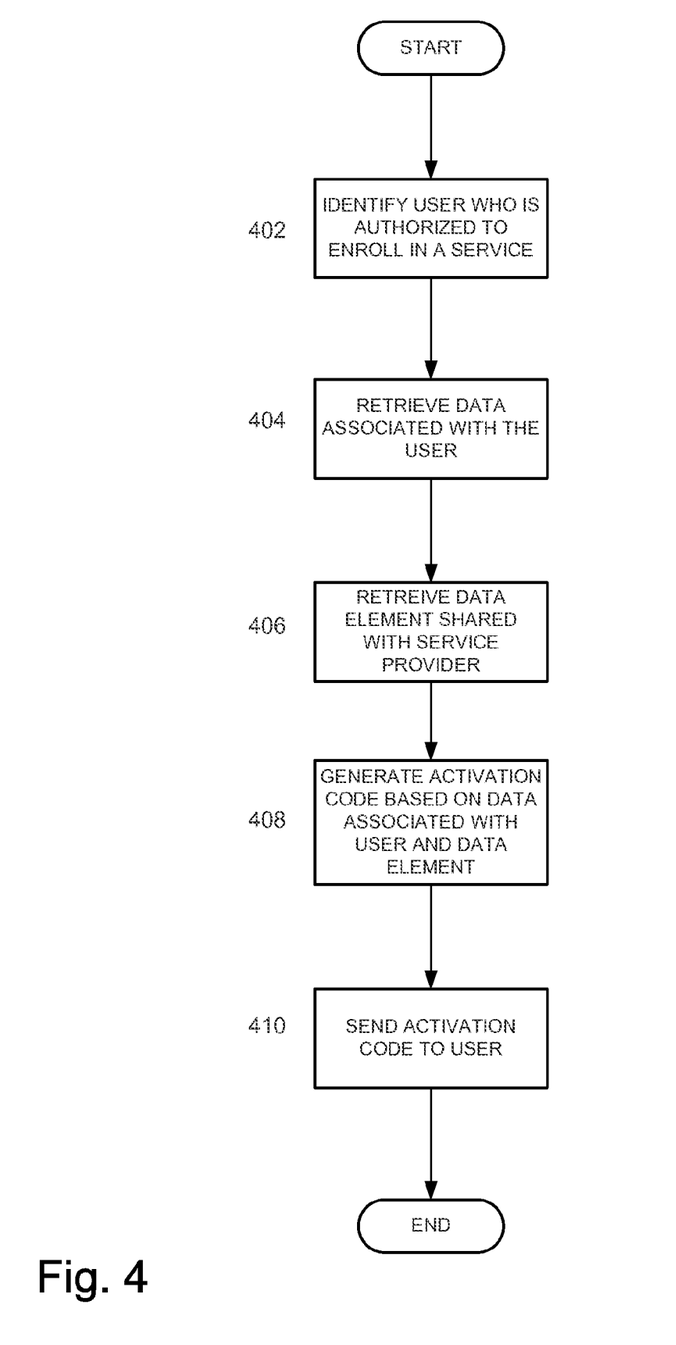
FIG. 4 depicts a high level block diagram of activation key generation.

FIG. 4 depicts a high level block diagram of activation key generation. The process may begin at step 402 by identifying a user who will be authorized to enroll in a service. The user can be identified by any criteria specified by an issuer. For example, the issuer may wish to authorize all users who have a good credit rating to enroll in a service. The specific criteria used by the issuer for identifying users is relatively unimportant. In some embodiments, the user themselves request authorization to enroll in a service, however this still allows the issuer to make the final determination as to if the user will be allowed to enroll for a service.

At step 404 data that is associated with the user is retrieved. As explained above, this data will typically be retrieved from the issuer's own data store. This data can include information such as addresses and social security numbers. The data will typically have been provided as part of the user's relationship with the issuer. As explained above, the issuer may store many pieces of information about the user, but only those pieces of information that are agreed to by the issuer and service provider will be retrieved in step 404.

At step 406 the data element that is shared with the service provider is retrieved. This data element can also be referred to as a pass phrase or password. As described above, in some embodiments, multiple versions of the shared data element are stored, and the version that is currently effective can be retrieved. At step 408, an activation code based on the data associated with the user and retrieved in step 404 and the shared data element retrieved in step 406 is generated. The activation code is generated using functions, such as a hash function, that would not allow the data used to generate the activation code to be recovered from the activation code.

At step 410, the activation code can be sent to the user. The user may then use the activation code to enroll for a service provided by a service provider by sending the activation code and data associated with the user to the service provider. The service provider, using the provided data and the shared data element can regenerate the activation code, and if the regenerated activation code and the received activation code are the same, the user can be enrolled in the service.

Figure 5:
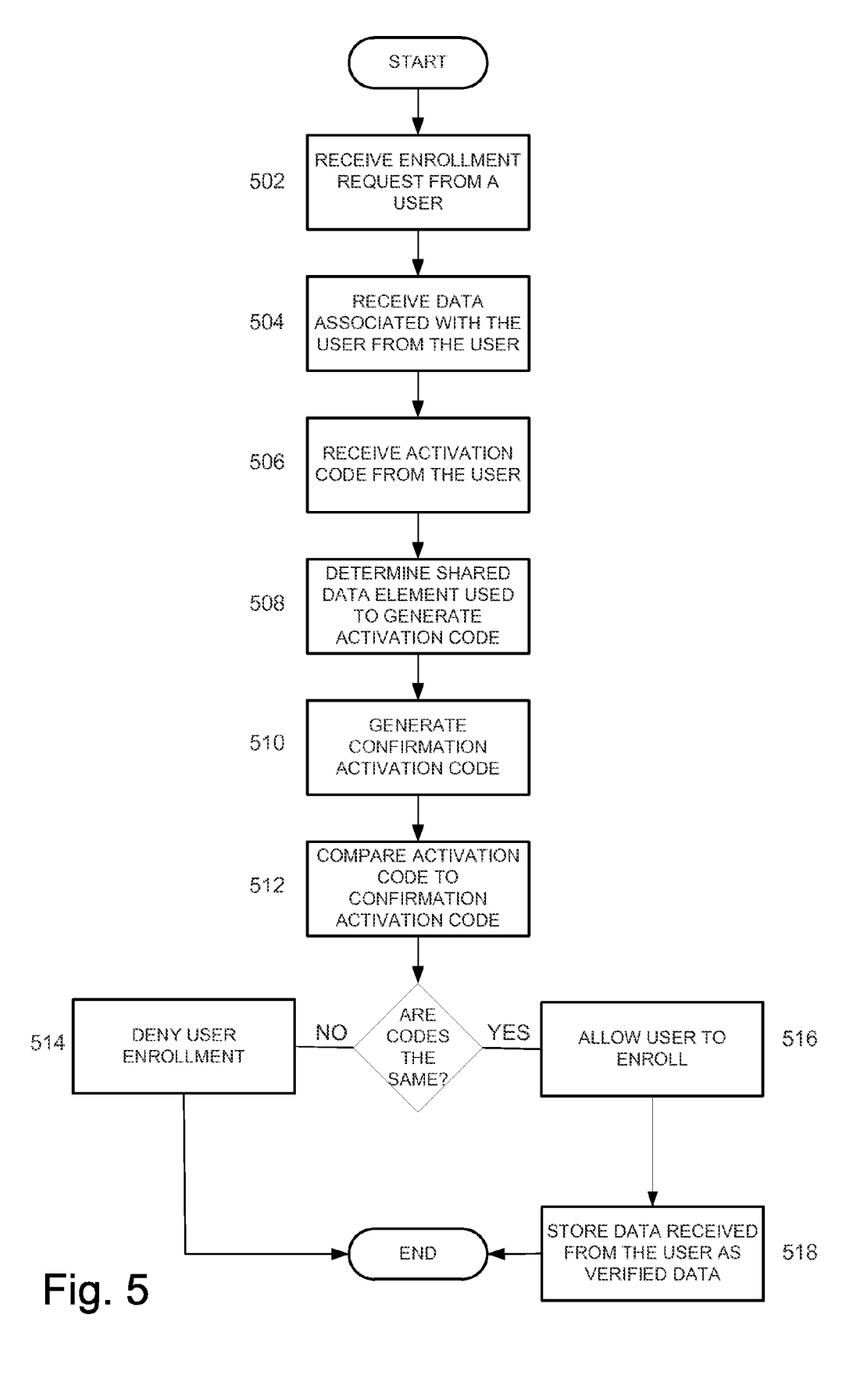
FIG. 5 depicts a high level block diagram of enrolling in a service using an activation key.

FIG. 5 depicts a high level block diagram of enrolling in a service using an activation key. The process may begin at step 502 with the receipt of an enrollment request from a user. As part of the enrollment process, at step 504 data associated with the user may be received. Such data may include items such as the user's name and address. At step 506 an activation key may be received from the user. As described above, possession of a valid activation key is an indication that the user is authorized to enroll in the service.

At step 508 the shared data element that was used to generate the activation code is retrieved. In some embodiments, the received activation code contains an indication that allows the correct shared data element to be retrieved. Once the correct shared data element is retrieved, a confirmation activation code can be generated at step 510. The confirmation activation code can be generated using the shared data element and the data associated with the user that was received in step 504. As described above, the specific data elements that will be used to generate the activation code and confirmation activation code are determined in advance. At step 512 the activation code and confirmation activation are compared.

If the codes are not the same, the process goes to step 514 and the user enrollment is denied. If the codes are the same, the process moves to step 516 and the user is allowed to enroll in the service. At step 518 the data received in step 504 can be stored. At least the portions of the data that were used in generation of the confirmation activation code at step 510 is verified because that same data was used in the generation of the activation code.

Figure 6:
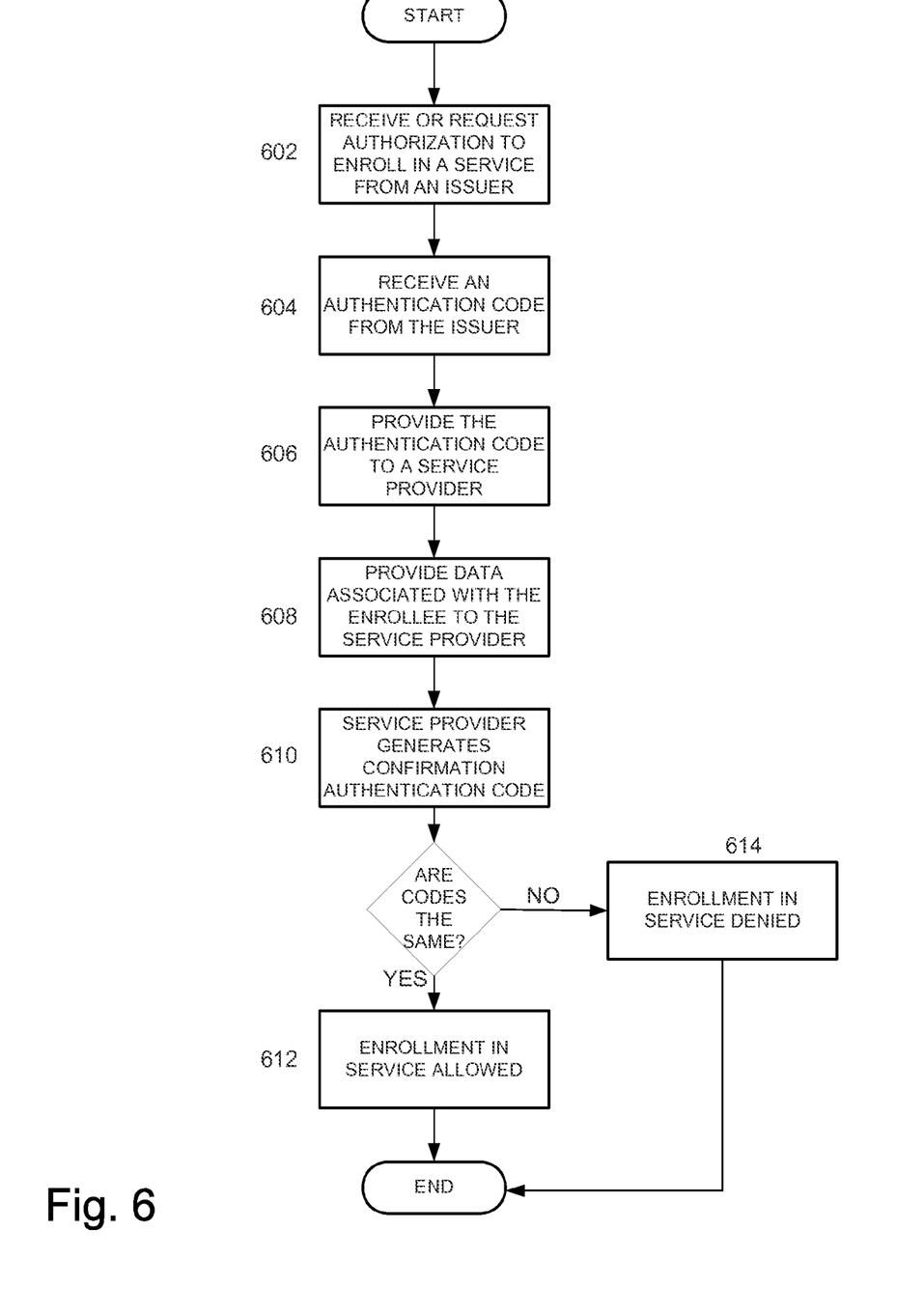
FIG. 6 depicts a high level block diagram of enrolling in a service.

FIG. 6 depicts a high level block diagram of enrolling in a service. At step 602 a user may receive or request authorization to enroll in a service. As described above, in some embodiments an issuer will select which users will be offered enrollment in a service, while in other embodiments, a user himself may request authorization to enroll in a service. At step 604 and activation key is received from the issuer. At step 606, the activation key is provided to the service provider. At step 608 the enrollee provides data associated with the enrollee to the service provider.

At step 610, the service provider generates an activation code, and if the activation code generated is the same as the activation code received in step 606, the process continues to step 612 and enrollment in the service is allowed. If the activation codes do not match, step 614 denies enrollment in the service.

Figure 7:
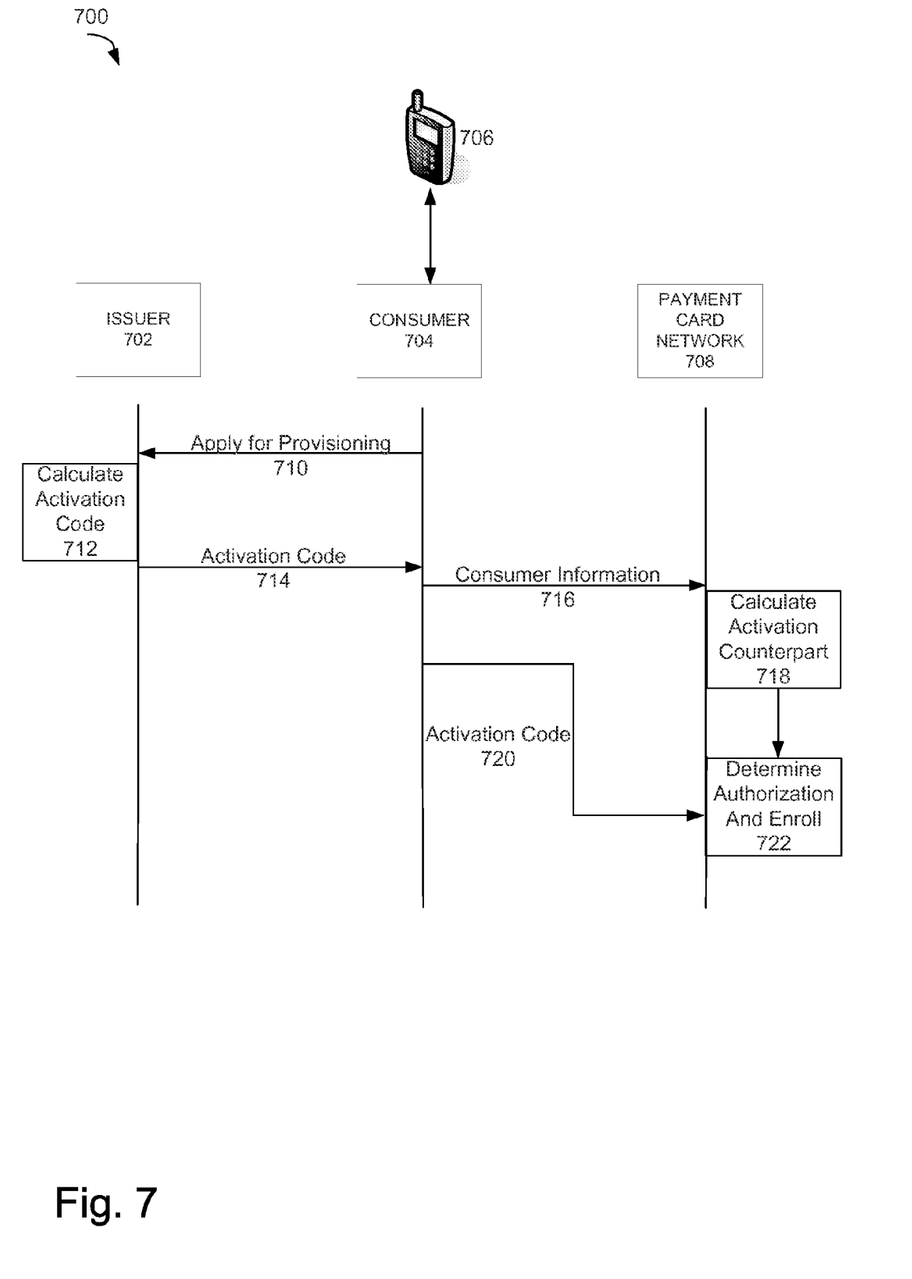
FIG. 7 depicts another exemplary system of the present disclosure.

FIG. 7 depicts another exemplary system of the present disclosure. Cell phones have become ubiquitous. Popular types of cell phones contain cameras, can play music, can be used to check e-mail, and provide any number of other functions. One particular application for mobile devices, such as cell phones, is their use in conducting payment transactions. Some types of mobile devices contain a short range wireless transmitter, such as an RFID element, that can be used to store a credit or debit card account number. A consumer conducting a transaction could simply wave his mobile device in front of a reader capable of receiving the transmission, and conduct a transaction without having to swipe his payment card. In some cases, the mobile devices are considerably sophisticated, providing the same ability to run applications as can be found on a standard computer. These applications may be used in relation to conducting payment transactions.

Regardless of the specific application, a consumer 704 may need his mobile device provisioned to allow use of his credit or debit account. The consumer 704 must generally get the permission of the issuer 702 of his account prior to provisioning his mobile device to conduct transactions. Additionally, the payment card network 708, such as Visa, will be the entity actually offering the applications that run on the consumer mobile device, and thus is the service provider. So, herein is a situation where a service is being offered by a service provider such as a payment card network 708. The consumer 704 will receive the benefits of the service. The issuer 702 needs to provide authorization for the consumer 704 to provision his mobile device for the service.

System 700 can include an issuer 702. Issuer 702 may typically be a bank or some other institution that issues payment accounts. The system can also include a consumer 704. The consumer 704 may wish to provision his mobile device 706 in order for the mobile device 706 to be usable for conducting transactions with a payment processing network 708. An exemplary payment processing network is the one that is offered by Visa. In order for the consumer 704 to provision his mobile device 706 to use an account issued by issuer 702 on a payment processing network 708, permission for such provisioning is needed.

In some embodiments, consumer 704 may send a request 710 to have his mobile device 706 provisioned to the issuer. The request can be in any number of forms, such as an e-mail, accessing a web site, sending an SMS message, a phone call, or any number of other communications channels. The issuer 702 may receive the request 712 determine if the consumer 704 should be allowed to provision his mobile device. For example, the issuer may restrict the provisioning of mobile devices to certain types of users (e.g. platinum card holders only) or certain types of mobile devices (e.g. smartphones only).

If the issuer 702 determines that the user should be allowed to provision his mobile device 706, the issuer will calculate an activation code 712 as has been described above. The activation code will use information about the consumer 704 that would be known to the issuer 702. The activation code can then be communicated 714 to the consumer 704. The consumer 704 may then begin the process of provisioning his mobile device 706 with the payment processing network 708.

As part of the provisioning process, the consumer 704 may send 716 consumer information to the payment processing network 708. Such information will at minimum include the same information that was used by the issuer 702 to calculate the activation code, but can also include additional information. The payment processing network 718 can then use the received consumer information 716 to calculate an activation counterpart, which can also be referred to as a confirmation activation code.

The issuer can then receive an activation code 720 from the consumer. The received activation code is compared 722 to the counterpart 718. If the two codes match, the payment processing network is ensured that the issuer 702 has authorized the consumer 704 to have his mobile device 706 provisioned. The payment processing network is also ensured that the consumer information 716 received from the consumer 704 is the same as that which is stored with the issuer 702.

Figure 8:
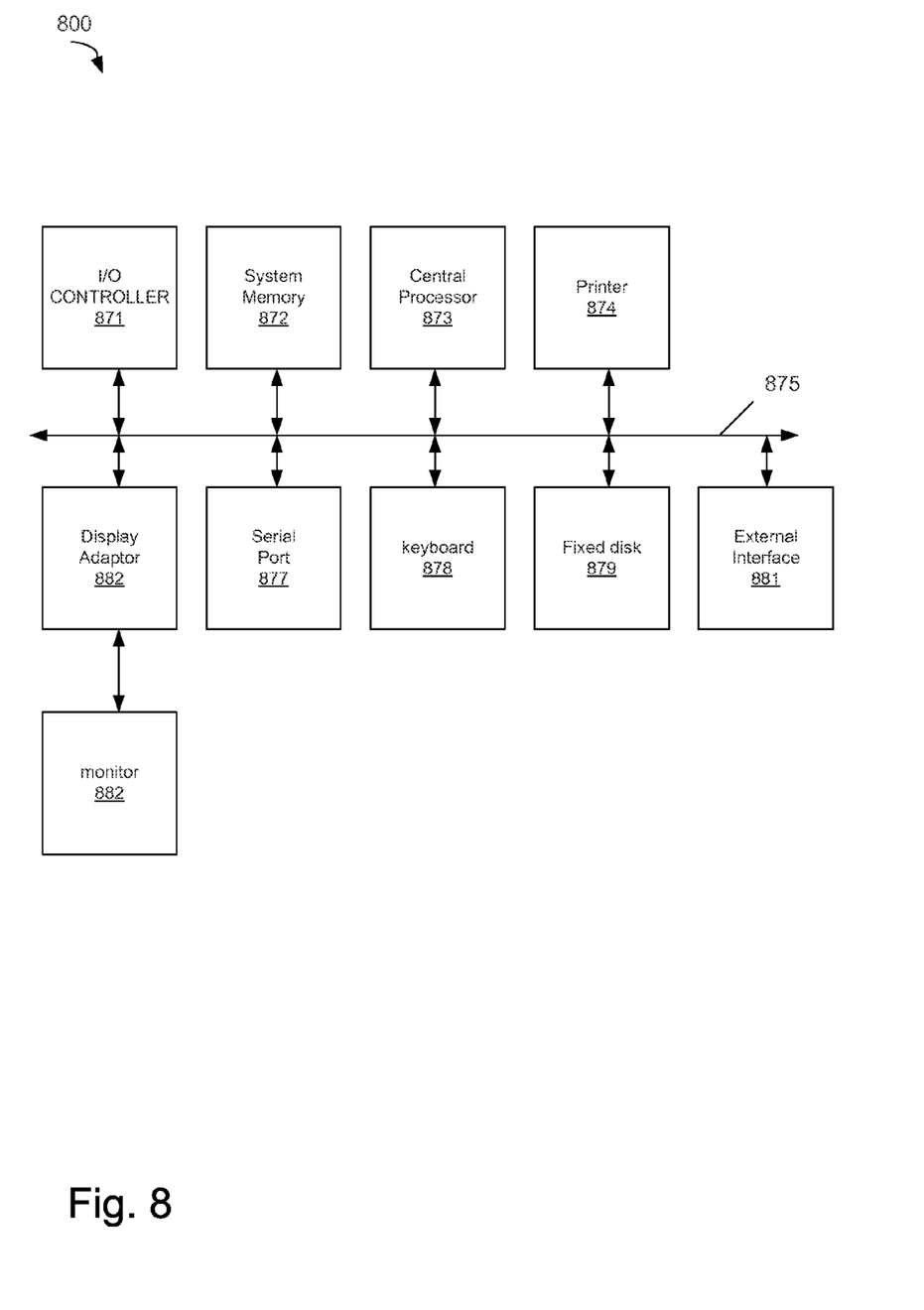
FIG. 8 depicts an exemplary computer system in which various embodiments of the disclosure may be implemented.

FIG. 8 depicts an exemplary computer system in which various embodiments of the disclosure may be implemented. Any of the elements depicted in the figures may be implemented on a computer system as depicted in FIG. 8. The computer system 800 may embody a tangible computer readable medium that stores instructions that instruct the processor to carry out any of the steps of the various embodiments of the disclosure.

The various participants and elements in the figures may operate or use one or more computer apparatuses to facilitate the functions described herein. Any of the elements in the figures (e.g., the issuer 102, the service provider 108, the card holder 110, etc.) may use any suitable number of subsystems to facilitate the functions described herein. Examples of such subsystems or components are shown in FIG. 8. The subsystems shown in FIG. 8 are interconnected via a system bus 875. Additional subsystems such as a printer 874, keyboard 878, fixed disk 879 (or other memory comprising computer readable media), monitor 876, which is coupled to display adapter 882, and others are shown. Peripherals and input/output (I/O) devices, which couple to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems. The system memory 872 and/or the fixed disk 879 may embody a computer readable medium.

Figure 9:
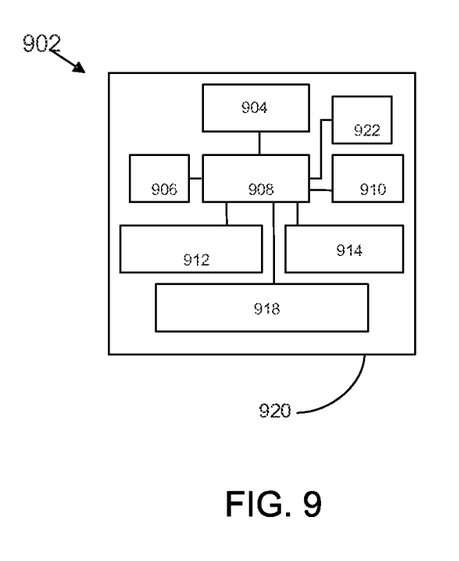
FIG. 9 depicts a block diagram of a mobile device

FIG. 9 depicts a block diagram of a mobile device and subsystems that may be present in computer apparatuses in systems according to embodiments of the disclosure.

The mobile device that is used in embodiments of the disclosure may be in any suitable form. For example, suitable mobile devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of mobile devices include cellular phones, smartphones, personal digital assistants (PDAs), pagers, payment cards, security cards, access cards, smart media, transponders, and the like. The mobile devices can also be debit devices (e.g., a debit card), credit devices (e.g., a credit card), or stored value devices (e.g., a stored value card).

An exemplary mobile device 902 in the form of a phone may comprise a computer readable medium and a body as shown in FIG. 9. FIG. 9 shows a number of components, and the mobile devices according to embodiments of the disclosure may comprise any suitable combination or subset of such components. The computer readable medium 906 may be present within the body 920, or may be detachable from it. The body 920 may be in the form a plastic substrate, housing, or other structure. The computer readable medium 906 may be a memory that stores data and may be in any suitable form including a magnetic stripe, a memory chip, encryption algorithms, private or private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile device 902 may further include a contactless element 918, which is typically implemented in the form of a semiconductor chip (or other data storage element) with an associated wireless transfer (e.g., data transmission) element, such as an antenna. Contactless element 918 is associated with (e.g., embedded within) portable consumer device 902 and data or control instructions transmitted via a cellular network may be applied to contactless element 918 by means of a contactless element interface (not shown). The contactless element interface functions to permit the exchange of data and/or control instructions between the mobile device circuitry (and hence the cellular network) and an optional contactless element 918.

Contactless element 918 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile device 902 and an interrogation device. Thus, the mobile device 902 is capable of communicating and transferring data and/or control instructions via both cellular network and near field communications capability.

The portable consumer device 902 may also include a processor 908 (e.g., a microprocessor) for processing the functions of the portable consumer device 902 and a display 910 to allow a consumer to see phone numbers and other information and messages. The mobile device 902 may further include input elements 912 to allow a consumer to input information into the device, a speaker 914 to allow the consumer to hear voice communication, music, etc., and a microphone 922 to allow the consumer to transmit her voice through the mobile device 902. The mobile device 902 may also include an antenna 904 for wireless data transfer (e.g., data transmission).

Embodiments of the disclosure are not limited to the above-described embodiments. For example, although separate functional blocks are shown for an issuer, service provider, and card holder, some entities perform more than one of these functions and may be included in embodiments of disclosure. A server computer may be a single device, or may be a combination of multiple computers acting in conjunction to provide the functionality of a single device.

Specific details regarding some of the above-described aspects are provided. The specific details of the specific aspects may be combined in any suitable manner without departing from the spirit and scope of embodiments of the disclosure. For example, the service provider and issuer may be combined in some embodiments of the disclosure. However, other embodiments of the disclosure may be directed to specific embodiments relating to each individual aspects, or specific combinations these individual aspects.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    receiving, by an issuer computer, a request message from a mobile device to provision a previously issued account on the mobile device for conducting transactions;
    identifying, by the issuer computer, that a user associated with the mobile device is authorized to provision the previously issued account on the mobile device based on issuer-specified criteria established by an issuer associated with the issuer computer;
    retrieving, by the issuer computer, data associated with the user and a shared data element shared between the issuer computer and a service provider computer, wherein the data associated with the user was provided as part of a relationship between the user and the issuer, and wherein only the data associated with the user agreed to by the issuer and the service provider is retrieved;
    generating, by the issuer computer, a first activation code by the issuer computer, the first activation code based on the data associated with the user and the shared data element; and
    sending, by the issuer computer, the first activation code to the mobile device, wherein the user sends the first activation code and the data associated with the user to the service provider computer, the service provider computer generates a second activation code based on the data associated with the user and the shared data element, and the service provider computer provisions the account associated with the user to the mobile device when the first and second activation codes are the same.

2. The method of claim 1, wherein generating the first and second activation codes comprises processing the data associated with the user with an algorithmic function that is known by the issuer computer and the service provider computer.

3. The method of claim 2, wherein the algorithmic function further takes as an input the shared data element that is shared between the issuer computer and the service provider computer.

4. The method of claim 3, wherein the first activation code includes the version identifier that specifies the version of the shared data element that was used to generate the first activation code.

5. The method of claim 4, wherein the step of generating the first activation code comprises:
    creating a text block containing the data associated with the user;
    appending the shared data element to the text block;
    processing the text block with a hashing algorithm, to generate a message authentication code; and
    appending the version identifier that specifies the version of the shared data element to the message authentication code.

6. The method of claim 1, wherein the data associated with the user that is used to generate the first activation code is retrieved from a database associated with the issuer computer and is not received from the user, and the data associated with the user that is used to generate the second activation code is received from the user.

7. The method of claim 6, further comprising:
storing the data associated with the user in a database associated with the service provider computer, wherein the service provider computer is ensured that the data associated with the user received from the user is the same as the data associated with the user stored in the database associated with the issuer computer.

8. The method of claim 7, wherein the data associated with the user stored in the database associated with the issuer computer and the data associated with the user stored in the database associated with the service provider computer are synchronized without requiring the service provider computer to have direct access to an issuer computer database.

9. The method of claim 1, wherein the previously issued account provisioned to the mobile device is accessible for conducting transactions by an application running on the mobile device, the application being provided by the service provider computer when the first and second activation codes are the same.

10. The method of claim 1, further comprising:
determining, by the issuer computer, that the user is authorized to provision the previously issued account associated with user to the mobile device based on issuer-specified criteria established by an issuer associated with the issuer computer.

11. The method of claim 1, wherein the service provider computer is a payment processing network server computer.

12. A server computer comprising:
a processor; and
a tangible non-transitory computer readable medium coupled to the processor, the computer readable medium comprising code, executable by the processor for implementing a method comprising:
receiving a request message from a mobile device to provision a previously issued account on the mobile device for conducting transactions;
identifying that a user associated with the mobile device is authorized to provision the previously issued account on the mobile device based on issuer-specified criteria established by an issuer associated with the server computer;
retrieving data associated with the user and a shared data element shared between the server computer and a service provider computer, wherein the data associated with the user was provided as part of a relationship between the user and the issuer, and wherein only the data associated with the user agreed to by the issuer and the service provider is retrieved;
generating a first activation code, the first activation code based on the data associated with the user and the shared data element; and
sending the first activation code to the mobile device, wherein the user sends the first activation code and the data associated with the user to the service provider computer, the service provider computer generates a second activation code based on the data associated with the user and the shared data element, and the service provider computer provisions the previously issued account associated with the user to the mobile device when the first and second activation codes are the same.

13. A method comprising:
receiving, by a service provider computer, data associated with a user from a mobile device;
receiving, by the service provider computer, an activation code from the mobile device, the activation code based on the data associated with the user, wherein the activation code was generated by an issuer computer when the user is identified as authorized to provision a previously issued account associated with user to the mobile device based on issuer-specified criteria established by an issuer associated with the issuer computer, wherein the data associated with the user was provided to the issuer as part of a relationship between the user and the issuer, wherein the data associated with the user was retrieved by the issuer computer from a database prior to generating the activation code, and wherein only the data associated with the user agreed to by the issuer and the service provider was retrieved;
generating, by the service provider computer, a confirmation activation code based on the data associated with the user and a shared data element;
authorizing, by the service provider computer, the previously issued account associated with the user to be provisioned on the mobile device when the activation code and the confirmation activation code are the same.

14. The method of claim 13, wherein the confirmation activation code was generated by processing the data associated with the user with an algorithmic function that is known by the service provider computer and the issuer computer.

15. The method of claim 14, wherein the algorithmic function further takes as an input the shared data element that is shared between the service provider computer and the issuer computer.

16. The method of claim 15, wherein the activation code includes a version identifier that specifies a version of the shared data element that was used to generate the first activation code.

17. The method of claim 16, wherein generating the confirmation activation code further comprises:
creating a text block containing the data associated with the user and received from the mobile device;
appending the shared data element specified by the version identifier to the text block; and
processing the text block with a hashing algorithm, to generate the activation code.

18. The method of claim 13, further comprising:
providing, by the service provider computer, an application to the mobile device for performing transactions using the previously issued account provisioned to the mobile device.

19. The method of claim 13, wherein the service provider computer is a payment processing network server computer.

20. A server computer comprising:
a processor; and
a tangible non-transitory computer readable medium coupled to the processor, the computer readable medium comprising code, executable by the processor for implementing a method comprising:
receiving data associated with a user from a mobile device;
receiving an activation code from the mobile device, the activation code based on the data associated with the user, wherein the activation code was generated by an issuer computer when the user is identified as authorized to provision a previously issued account associated with user to the mobile device based on issuer-specified criteria established by an issuer associated with the issuer computer, wherein the data associated with the user was provided to the issuer as part of a relationship between the user and the issuer, wherein the data associated with the user was retrieved by the issuer computer from a database prior to generating the activation code, and wherein only the data associated with the user agreed to by the issuer and the service provider was retrieved;

generating a confirmation activation code based on the data associated with the user and a shared data element;

authorizing the previously issued account associated with the user to be provisioned on the mobile device when the activation code and the confirmation activation code are the same.

* * * * *